Dec. 13, 1927.
A. WEILAND
1,652,651
METHOD OF FORMING UNIVERSAL JOINTS
Original Filed Sept. 30, 1926  2 Sheets-Sheet 1
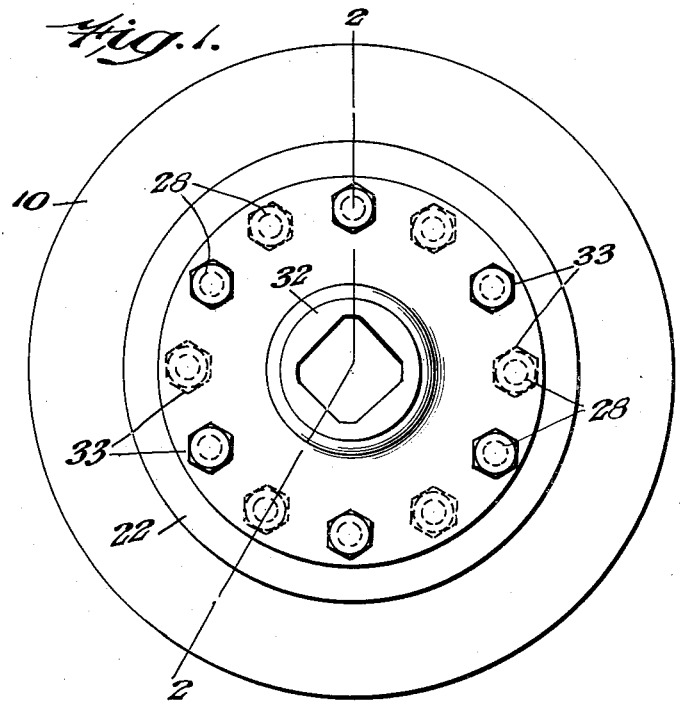
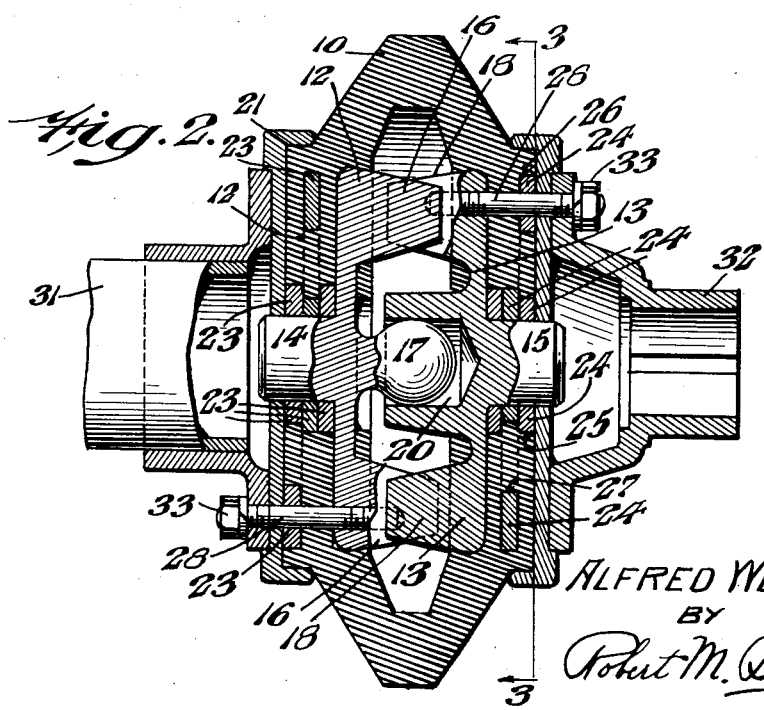
Inventor
ALFRED WEILAND,
BY
Robert M. Barr.
Attorney Dec. 13, 1927.
A. WEILAND
1,652,651
METHOD OF FORMING UNIVERSAL JOINTS
Original Filed Sept. 30, 1926   2 Sheets-Sheet 2
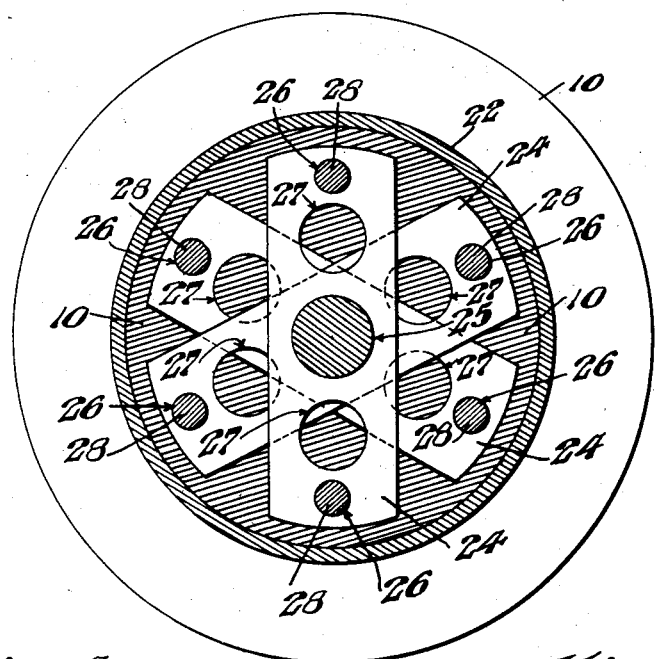
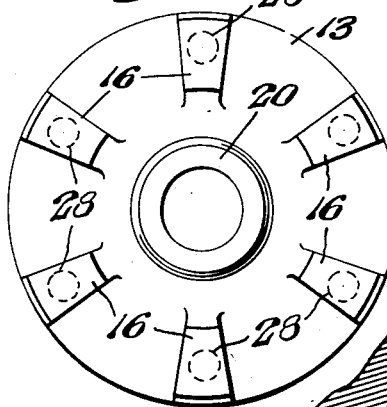
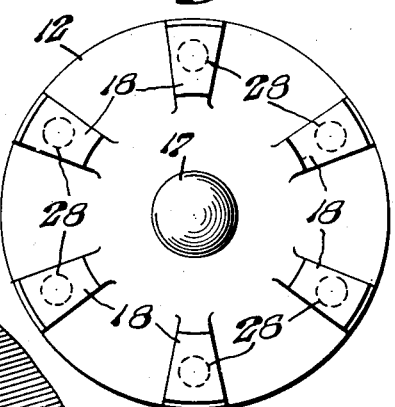
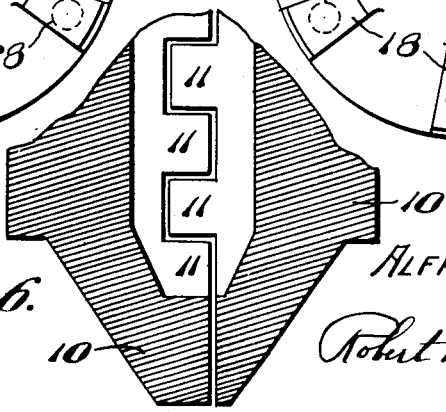
Inventor
ALFRED WEILAND,
BY
Robert M. Barr
Attorney Patented Dec. 13, 1927.

1,652,651

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

METHOD OF FORMING UNIVERSAL JOINTS.

Original application filed September 30, 1926. Serial No. 138,666. Divided and this application filed January 20, 1927. Serial No. 162,315.

The present invention relates to power transmitting devices and more particularly to a method of forming a resilient universal joint structure such as shown in application Serial No. 138,666, filed September 30, 1926, and of which this application is a division.

Some of the objects of the present invention are to provide an improved universal joint and method of making the same; to provide a universal joint utilizing rubber or other resilient material as a component part; to provide a method of forming an entirely enclosed universal joint whereby a lubricant can be sealed therein without danger of leaking to the exterior thereof; to provide a method of making a rubber or resilient power transmitting joint wherein the resilient parts are protected from excessive and undue torsional or other stresses; to provide a method of forming a resilient type of universal joint whereby an accurate centering of the parts is possible; to provide a method of forming an effective connection between resilient and metal parts of a resilient universal joint; and to provide other improvements as will hereinafter appear.

In the accompanying drawings Fig. 1 represents an end elevation of a universal joint embodying one form of the present invention; Fig. 2 represents a section on line 2—2 of Fig. 1; Fig. 3 represents a section on line 3—3 of Fig. 2; Fig. 4 represents a face of one of the inserts of the device; Fig. 5 represents a face of another of the inserts; and Fig. 6 represents an enlarged sectional detail of a portion of the body prior to final molding.

Referring to the drawings, one form of the present invention consists of a hollow body 10 of molded rubber or other resilient material having in side elevation the general contour of a circular disc, and in section the approximate shape of an elongated hexagon, though the invention is not limited to any exact shape. The hollow body 10, as will later more particularly appear, is molded in halves (as seen in Fig. 6), a preliminary molding and vulcanizing operation first taking place on each half to give a permanent shape, and then a final vulcanizing after the associated parts are in place to mold the halves together to make a unitary body with a solid joint. The preliminary molding is arranged to form jaw clutches 11 on each half of the body 10 and the arrangement is such that the two sets of clutches 11 interfit and form a circumferential interlocking joint which gives maximum resistance to torsional strains.

In order to reinforce the resilient material, the parts of the body are respectively provided with metal insert auxiliary clutches 12 and 13 provided respectively with axially disposed shanks 14 and 15 for centering purposes. The auxiliary clutch 12 is formed with a plurality of circumferentially spaced teeth 16 projecting from one face thereof, while projecting from the same face but axially thereof is a ball member 17. The auxiliary clutch 13 is also formed with a plurality of circumferentially spaced teeth 18 projecting from one face thereof, while projecting from the same face but concentric with respect to the axis of the clutch is a socket bearing 20 arranged to receive the ball member 17. The spacing of the teeth 16 and 18 is uniform and such that when the two clutches are assembled in teeth interfitting relation one clutch part can turn approximately fifteen degrees with respect to the other before the two sets of teeth actually engage each other. Thus when the clutches 12 and 13 are properly molded into the body 10, it will be evident that all minor torsional stresses will be taken by the resilient body 10 alone while stresses tending to distort the body 10; for example, fifteen degrees circumferentially, will bring the clutch teeth 16 and 18 into engagement to thereby prevent undue strain upon the molded interlocked body 10.

The opposite side faces of the body 10 are of shouldered construction to respectively seat within side cap plates 21 and 22 which are each centrally apertured to receive the respective shanks 14 and 15 and thus provide the desired concentric arrangement of the parts, all of which are centered by the aforesaid shanks 14 and 15.

In order to secure the maximum drive between the clutch inserts 12 and 13 and the cap plates 21 and 22, a plurality of metal strips 23 and 24 preferably of steel are provided, three, in the present instance, being provided for each side of the body 10. Each of these strips 23 and 24 is formed with a central opening 25, two end holes 26, and two intermediate holes 27, the opening 25 in the strip 23 at one side being to receive the centering shank 14, and the opening 25 in the strip 24 at the other side being to receive the centering shank 15. The holes 26 are respectively to allow the passage of clamping bolts 28, and the intermediate holes 27 to receive the rubber or other material of the body when it is molded, whereby the strips 23 and 24 are permanently made fast to the body 10. For equal distribution of the stresses transmitted to the strips 23 and 24 and the body 10, the strips of each set have their longitudinal axes spaced at sixty degree angles. The bolts 28 also serve at one side to clamp a hub 30 in centered position to receive and hold a driving member 31, and at the other side to clamp a hub 32 by which the opposite side of the device is made fast to a driven part.

From the foregoing it will be apparent that the method of the present invention consists in molding a resilient hollow casing in two separate halves, each half having a generally circular circumferential flange of stepped or toothed contour. Following the molding of these two parts, each with its insert therein, the two halves are placed together in face to face arrangement, with the toothed portions interfitting, and the second molding operation then takes place to produce a complete unitary hollow casing, the circumferential medial portion of which is relatively thick and reinforced against torque strains by the interfitting sets of teeth. In connection with the method, one form of the invention as used practically is shown, though it is to be understood that the invention is not limited to the exact arrangement of inserts and their associated parts.

It will now be apparent that a complete unitary flexible universal joint has been provided wherein all of the operating parts are protected by the integral molded flexible casing and in which a lubricant, if desired, may be contained without danger of loss through leakage. Furthermore, the joint of the present invention while having all desirable qualities of free and unrestricted movement for the intended purpose also gives the maximum strength. The construction also provides for accurate centering of the parts and ensures a combined metal and rubber relation which is practical, cooperative, and cannot expose the resilient material to stresses beyond its limit of resistance.

Having thus described my invention, I claim:

1. The method of forming a universal joint which consists in molding two clutch members including a universal connection into the halves respectively of a resilient casing, and providing the meeting edges of the casing halves with interfitting lugs, molding fastening devices into said casing parts, and molding and vulcanizing said halves together along the lug joints to form a hollow unitary casing.

2. The method of forming a resilient torque transmitting casing which consists in molding two sections, each section having a plurality of projecting lugs on one face, placing said sections together in face to face relation with the lugs of one section interfitting the lugs on the other section, and subjecting the fitted sections to a molding operation to form a unitary casing.

Signed at Philadelphia, county of Philadelphia, State of Pennsylvania, this 11th day of January, 1927.

ALFRED WEILAND.